G. W. NORDSTRUM.
THRUST BEARING.
APPLICATION FILED AUG. 4, 1919.

1,355,350. Patented Oct. 12, 1920.

Witness:
Geo. C. Davison

Inventor:
George W. Nordstrum
By Pond & Wilson,
Attys.

UNITED STATES PATENT OFFICE.

GEORGE W. NORDSTRUM, OF CHICAGO, ILLINOIS.

THRUST-BEARING.

1,355,350.   Specification of Letters Patent.   Patented Oct. 12, 1920.

Application filed August 4, 1919. Serial No. 315,144.

*To all whom it may concern:*

Be it known that I, GEORGE W. NORDSTRUM, a citizen of the United States, residing at Chicago, in the county of Cook and State of Illinois, have invented certain new and useful Improvements in Thrust-Bearings, of which the following is a specification.

This invention relates to improvements in thrust bearings of the anti-friction type, wherein a series of ball or roller elements held in spaced relation by a suitable confining ring or cage are mounted between a pair of race rings that, in turn, are secured to the opposing faces of a pair of relatively rotatable elements between which a thrust condition exists.

Anti-friction thrust bearings of this type are quite extensively used in a variety of situations, and the principal object of the present invention is to provide an improved and more efficient bearing of this type than has heretofore been known. More specific objects of the invention are, first, to provide a bearing in which frictional wear upon contacting portions of the ball retainer or cage and the race rings shall be substantially eliminated, and, second, to provide a bearing wherein the wear of the balls or rollers upon the race rings shall be more widely distributed and consequently less in extent than heretofore. The first of the above stated specific objects is attained by the employment of a floating core-piece lying between the inner portions of the race rings and within the plane of the ball cage and constituting a support for the inner periphery of the latter; and the second of the above stated specific objects is attained by providing a staggered arrangement of the balls in the ball cage, and dispensing with the usual shallow race ways or grooves in the inner faces of the race rings, and causing the balls to roll upon the flat inner faces of the race rings in line contact therewith.

Still further objects and advantages of the invention will be apparent to those skilled in the art from the following detailed description, taken in connection with the accompanying drawings wherein I have shown a practical and preferred embodiment of the invention, and in which—

Figure 1:
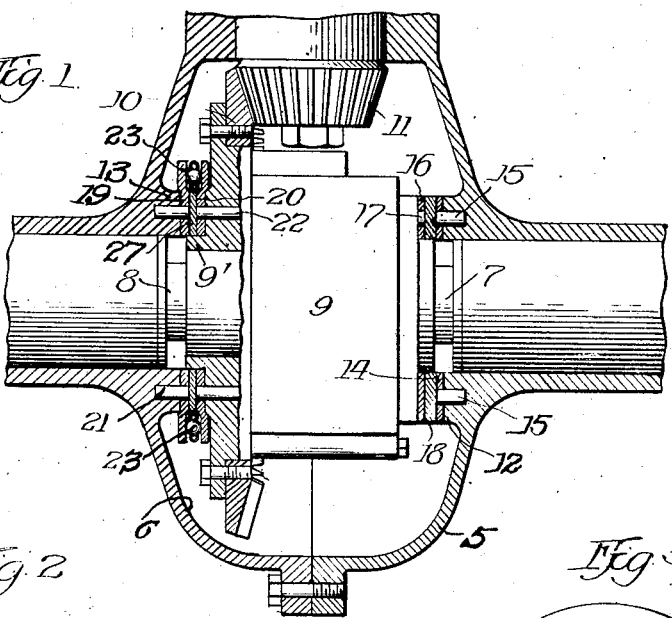
Figure 1 is a central axial section taken through a conventional type of small motor car differential, illustrating one practical and useful application of the present invention.
Figure 2:
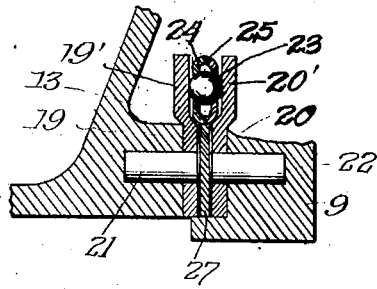
Fig. 2 is an enlarged sectional detail showing a portion of the bearing shown in Fig. 1.
Figure 5:
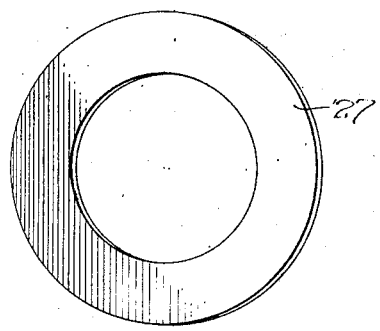
Fig. 5 is a face view of the central floating core ring which supports the ball retainer or cage.

Referring to the drawings, 5 and 6 indicate the split sections of a differential casing or housing, into which extend the shaft sections 7 and 8, respectively; these latter extending into a differential cage 9, to which a bevel ring gear 10 is bolted in the usual manner; the ring gear 10 meshing with the usual driving bevel pinion 11 on the end of the transmission shaft (not shown). As shown in Figs. 1 and 2, the differential casing or housing includes inwardly directed hub extensions 12 and 13 formed integrally upon the inner surfaces of the casing sections 5 and 6. The cage element 9 is journaled upon the inner ends of the shaft sections 7 and 8, and is held against longitudinal movement within the differential housing by end bearings. One of said end bearings, which receives but very little thrust, may consist of a plain ring 14 secured by pins 15 on the inner hub extension 12 of the housing, and another ring 16 secured by pins 17 upon the differential cage 9, with an idler bearing ring 18 disposed therebetween.

Figure 3:
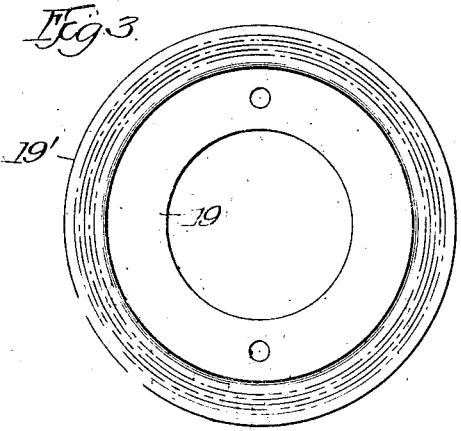
Fig. 3 is an interior face view of one of the bearing race rings.

At the left side of the differential mechanism as shown in Fig. 1, I have illustrated an application of my improved thrust bearing designed to resist the end thrust created by the driving pinion 11 in mesh with the large bevel gear 10. This anti-friction bearing comprises a pair of race rings 19 and 20, the former secured by pins 21 to the face of the hub extension 13 of the casing, so as to be non-rotatable, and the latter similarly secured by pins 22 to the opposed end of the differential cage 9. It will be noted by reference to Figs. 2 and 3 that the outer marginal portions of the race rings 19 and 20 which extend beyond the periphery of the hub extension 13 are outwardly offset, such outwardly offset portions being designated by 19′ and 20′, respectively; and it will be further noted that the inner faces of these outwardly offset marginal portions of the race rings are not groved to form a race way, as is usual, but are perfectly flat and parallel.

Figure 4:
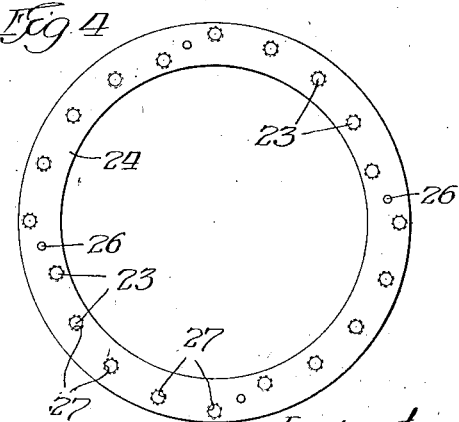
Fig. 4 is a face view of the ball retainer or cage, illustrating a preferred staggered arrangement of the balls.

Between the offset marginal portions 19′ and 20′ of the race rings are interposed a series of roller elements, herein shown as balls 23, confined in and spaced by a retainer ring or cage, this latter comprising a pair of shallow channel sections 24 and 25 united by rivets 26 (Fig. 4) and formed at uniformly spaced intervals with holes 27; the margins of opposed holes serving to retain the balls 23 confined therebetween. The balls are, of course, of a diameter slightly exceeding the width of the retainer ring or cage so as to project slightly beyond the sides of the latter and into rolling contact with the opposed flat inner faces of the offset marginal portions 19′ and 20′ of the race rings 19 and 20. It will further be observed by reference to Fig. 4 that the balls are not at equal radial distances from the center of the ball retainer or cage, but are staggered around the latter in groups of five in the present instance, the members of each group all being at different radial distances from the center of the cage. The result of this is that the balls of each group all have different paths of contact with the flat inner faces of the race rings as is indicated by the concentric circles in Fig. 3 designating line paths of rolling contact of the balls. The beneficial results of this arrangement are several. In the first place, the rolling wear of the balls is distributed over a wider area than where the balls all run in a single path. In the second place, each ball has but a single point of contact with the face of each race ring, and its path of travel has only the width of a single line. This involves much less friction than in the case where the ball travels in a concave path or groove and has a transverse line contact with the latter. In the third place, the necessity of machining or stamping rings to form a grooved path or race for the balls is dispensed with, thus simplifying the process of manufacture. As best shown in Fig. 2, the ball cage has a thickness exceeding the distance between the inner portions of the race rings.

I have found from experience with thrust bearings of the general type to which my present invention belongs, that excessive wear soon develops between the ball cage or retainer and the inner portions of the race rings which support the weight of the ball cage and the balls. With a view to obviating this fault, I have provided between the opposed faces of the race rings 19 and 20 a floating ring 27 that lies in the plane of the ball cage and has an external diameter such as to just fit the inner periphery of the ball cage, as clearly shown in Figs. 1 and 2. This floating ring 27 constitutes a core for the ball cage, carrying the weight of the latter and the balls, and thus relieving the inner portions of the race rings 19 and 20 of this wear, and thereby prolonging the life of the latter parts. The annular core-piece 27 might be attached to either of the race rings 19 and 20, but preferably it is attached to neither, and simply floats in the space between the two, being itself supported on the hub extension 9′ of the cage 9. Of course, the core-piece 27 is of such a thickness as to lie with slight clearance between the race rings 19 and 20 and not take up or resist any of the end thrust which is properly resisted by the offset margins 19′ and 20′ and the balls 23. But in the event of excessive or abnormal thrust such as otherwise might crush the balls, the floating ring or core-piece 27 comes into action to resist such abnormal or excessive end thrust, and thereby serves as a factor of safety to prevent injury to the balls or rollers.

It is believed that the novel features of the present invention, the manner in which they function, and the advantages flowing therefrom will be readily understood by persons familiar with the construction and operation of thrust bearings of this general type without further detailed description; and hence, without limiting the invention to the exact form and arrangement of parts shown and described,—

I claim—

1. In a thrust bearing of the character described, the combination of a pair of race rings having their outer marginal portions laterally offset outwardly and formed with opposed bearing surfaces, an annular ball cage lying between said bearing surfaces, said ball cage having a thickness exceeding the distance between the inner portions of said race rings, balls mounted in said cage and in rolling contact with said bearing surfaces, and a floating core-piece disposed between the inner portions of said race rings and in the plane of said cage and in bearing contact with the inner periphery of the latter.

2. In a thrust bearing of the character described, the combination of a pair of race rings having their outer marginal portions laterally offset outwardly and formed with flat parallel bearing surfaces, an annular ball cage lying between said bearing surfaces, said ball cage having a thickness exceeding the distance between the inner portions of said race rings, balls mounted in staggered relation in said cage, said balls being in rolling contact with said bearing surfaces and traveling on non-coincident line paths on the latter, and a floating core-ring disposed between the inner portions of said race rings and in the plane of said cage and in bearing contact with the inner periphery of the latter.

GEORGE W. NORDSTRUM.